(12) United States Patent
Nakajima

(10) Patent No.: US 9,421,687 B2
(45) Date of Patent: Aug. 23, 2016

(54) ROBOT CONTROL APPARATUS AND ROBOT CONTROL METHOD

(71) Applicant: CANON KABUSHIKI KAISHA, Tokyo (JP)

(72) Inventor: Yohji Nakajima, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 13/922,726

(22) Filed: Jun. 20, 2013

(65) Prior Publication Data

US 2014/0012419 A1 Jan. 9, 2014

(30) Foreign Application Priority Data

Jul. 5, 2012 (JP) ................................. 2012-151733

(51) Int. Cl.
*B25J 9/16* (2006.01)

(52) U.S. Cl.
CPC .............. *B25J 9/1633* (2013.01); *B25J 9/1664* (2013.01); *G05B 2219/40454* (2013.01); *G05B 2219/40519* (2013.01)

(58) Field of Classification Search
CPC ...... B25J 9/1633; B25J 9/1664; B25J 9/1674; G05B 2219/40454; G05B 2219/40519
USPC .............................................. 700/261; 901/2
See application file for complete search history.

(56) References Cited

U.S. PATENT DOCUMENTS

| 5,331,264 | A | * | 7/1994 | Cheng | G05B 19/416 318/560 |
| 5,655,060 | A | * | 8/1997 | Lucas | B25J 9/1664 318/560 |
| 6,002,971 | A | * | 12/1999 | Lucas | 700/250 |
| 6,216,058 | B1 | * | 4/2001 | Hosek | B25J 9/1664 318/568.21 |
| 6,922,606 | B1 | * | 7/2005 | Yutkowitz | G05B 19/00 318/560 |
| 7,342,560 | B2 | | 3/2008 | Yuki et al. | |
| 8,238,829 | B2 | | 8/2012 | Nakajima | |
| 2002/0186245 | A1 | * | 12/2002 | Chandhoke | G05B 19/0426 715/764 |
| 2003/0033050 | A1 | * | 2/2003 | Yutkowitz | G05B 19/4103 700/189 |
| 2003/0108415 | A1 | * | 6/2003 | Hosek | B25J 9/1664 414/783 |
| 2003/0144751 | A1 | * | 7/2003 | Chandhoke | G05B 19/042 700/61 |

(Continued)

FOREIGN PATENT DOCUMENTS

JP 2004-25355 1/2004
JP 2006-528813 12/2006

(Continued)

*Primary Examiner* — Khoi Tran
*Assistant Examiner* — Robert Nguyen
(74) *Attorney, Agent, or Firm* — Fitzpatrick, Cella, Harper & Scinto

(57) ABSTRACT

A robot control apparatus controls a robot arm driven by transmitting drive forces to joints from respective electric motors so that the robot arm follows a specified trajectory, based on an instruction value instructed against the electric motors. A movable range of the robot arm is divided into multiple spaces, and constraint conditions including a constraint value of a jerk for each joint, which is determined so that a load torque applied to a transmitting component of the drive force falls within an allowable range in the multiple spaces, is calculated in advance. The constraint conditions are stored in a storage unit. A calculating unit generates the instruction values for the electric motors based on the trajectory by solving an optimization problem that uses the constraint conditions stored in the storage unit as an inequality constraint.

6 Claims, 12 Drawing Sheets

(56) References Cited

U.S. PATENT DOCUMENTS

| | | | | |
|---|---|---|---|---|
| 2003/0216822 A1* | 11/2003 | Sato | ............... | G05B 19/19 700/63 |
| 2004/0122557 A1* | 6/2004 | Chandhoke | ............... | G05B 19/4103 700/245 |
| 2004/0249509 A1* | 12/2004 | Rogers | ............... | B25J 9/1664 700/245 |
| 2008/0152463 A1* | 6/2008 | Chidambaram | ............... | B25J 9/107 414/217 |
| 2009/0200978 A1* | 8/2009 | Kato | ............... | B25J 9/1674 318/566 |
| 2010/0063603 A1* | 3/2010 | Chandhoke | ............... | G05B 19/40937 700/34 |
| 2011/0087375 A1* | 4/2011 | Aurnhammer | ............... | G05B 19/416 700/262 |
| 2012/0010747 A1* | 1/2012 | Okazaki | ............... | 700/253 |
| 2013/0064637 A1* | 3/2013 | Hosek | ............... | H01L 21/67742 414/800 |
| 2013/0197688 A1* | 8/2013 | Egi | ............... | G05B 19/416 700/180 |
| 2013/0236203 A1 | 9/2013 | Nakajima et al. | | |
| 2013/0338827 A1* | 12/2013 | One | ............... | B25J 9/10 700/252 |
| 2014/0188273 A1* | 7/2014 | Khoukhi | ............... | B25J 9/162 700/250 |
| 2014/0277744 A1* | 9/2014 | Coenen | ............... | B25J 9/163 700/264 |
| 2015/0025684 A1* | 1/2015 | Negishi | ............... | B25J 9/1664 700/261 |

FOREIGN PATENT DOCUMENTS

| | | |
|---|---|---|
| JP | 2009-184095 A | 8/2009 |
| JP | 4335286 A | 9/2009 |
| JP | 2011-167827 A | 9/2011 |
| KR | 10-1998-0703447 A | 11/1998 |
| KR | 10-2002-0072493 A | 9/2002 |

* cited by examiner

| STARTING POINT | | END POINT | | | |
|---|---|---|---|---|---|
| | | 1302 | 1303 | 1304 | 1305 |
| | 1302 | | MOVEMENT 1 | MOVEMENT 2 | MOVEMENT 3 |
| | 1303 | MOVEMENT 4 | | MOVEMENT 5 | MOVEMENT 6 |
| | 1304 | MOVEMENT 7 | MOVEMENT 8 | | MOVEMENT 9 |
| | 1305 | MOVEMENT 10 | MOVEMENT 11 | MOVEMENT 12 | |

ROBOT CONTROL APPARATUS AND ROBOT CONTROL METHOD

BACKGROUND OF THE INVENTION

1. Field of the Invention

The present invention relates to a robot control APPARATUS and method for controlling a robot arm that is driven to follow a specified trajectory, based on an instruction value to be instructed against a drive source corresponding to each of multiple joints.

2. Description of the Related Art

In recent years, industrial robots that perform assembly and the like in a factory have been demanded to adapt to production speed improvement and complex movement, and have been demanded to increase their movement speed. In order to increase the movement speed of a robot, steep acceleration and deceleration is required in joint drive. On the other hand, the robot includes a speed reducer, a belt, a bearing, and the like as transmitting components for transmitting a drive force from a drive source (actuator) to a joint, but particularly the speed reducer generally has low rigidity, and hence vibration easily occurs when steep acceleration and deceleration is performed. When this vibration acts on the transmitting components, those transmitting components are overloaded, which is not preferred from the viewpoint of durability.

In view of this, there has been proposed an apparatus configured to estimate the load to be applied to the transmitting component during the robot movement by a disturbance observer, detect the overload through comparison with a threshold value, and perform processing of protecting the robot when the overload is detected (see Japanese Patent No. 4335286).

Further, there has been proposed an apparatus configured to calculate the magnitude of the vibration in the robot based on vibration characteristics, optimize the trajectory by incorporating the magnitude of the vibration in an evaluation function, and control the robot with use of the optimized trajectory (see Japanese Patent Application Laid-Open No. 2011-167827). With this, it is possible to reduce the vibration to be generated during the robot movement.

The technology described in Japanese Patent No. 4335286 can protect the robot, but when the overload is detected during the robot movement, it is necessary to proceed to the processing of protecting the robot, which leads to a problem that the takt time is affected.

Further, the technology described in Japanese Patent Application Laid-Open No. 2011-167827 can reduce the vibration to be generated during the robot movement, but even if the vibration is reduced, the load torque that acts on the transmitting component is not always reduced. In other words, for example, as the rigidity of the transmitting component becomes higher, the vibration is reduced, and hence the movement speed may increase by the calculating method described in Japanese Patent Application Laid-Open No. 2011-167827, but when the transmitting component is brittle, the transmitting component may not be able to withstand the increased movement speed. That is, even when the trajectory to reduce the vibration is calculated, the load torque to be applied to the transmitting component is not always reduced, and hence there is a problem in that the durability of the robot is not always improved through the reduction of the vibration.

SUMMARY OF THE INVENTION

In view of the above, the present invention provides a robot control apparatus and method capable of improving durability of a robot without significantly affecting the takt time.

According to an exemplary embodiment of the present invention, there is provided a robot control apparatus, which is configured to control a robot arm to be driven by transmitting a drive force to each of multiple joints from each of drive sources corresponding thereto via a transmitting component so that the robot arm follows a specified trajectory, the control being carried out based on an instruction value to be instructed against the each of the drive sources, the robot control apparatus including: a storage unit for storing constraint conditions including a constraint value of a jerk for each of the multiple joints, the constraint conditions being determined so that, when a movable range of the robot arm is divided into multiple spaces, a load torque to be applied to the transmitting component falls within an allowable range in each of the multiple spaces; and a calculating unit for generating the instruction value based on the specified trajectory of the robot arm by solving an optimization problem that uses the constraint conditions stored in the storage unit as an inequality constraint.

Further, according to another exemplary embodiment of the present invention, there is provided a robot control method for controlling a robot arm to be driven by transmitting a drive force to each of multiple joints from each of drive sources corresponding thereto via a transmitting component so that the robot arm follows a specified trajectory, the control being carried out based on an instruction value to be instructed against the each of the drive sources, the robot control method including: storing, in a storage unit, constraint conditions including a constraint value of a jerk for each of the multiple joints, the constraint conditions being determined so that, when a movable range of the robot arm is divided into multiple spaces, a load torque to be applied to the transmitting component falls within an allowable range in each of the multiple spaces; and generating, by a calculating unit, the instruction value based on the specified trajectory of the robot arm by solving an optimization problem that uses the constraint conditions stored in the storage unit as an inequality constraint.

Further features of the present invention will become apparent from the following description of exemplary embodiments with reference to the attached drawings.

DESCRIPTION OF THE EMBODIMENTS

First Embodiment

Figure 1:
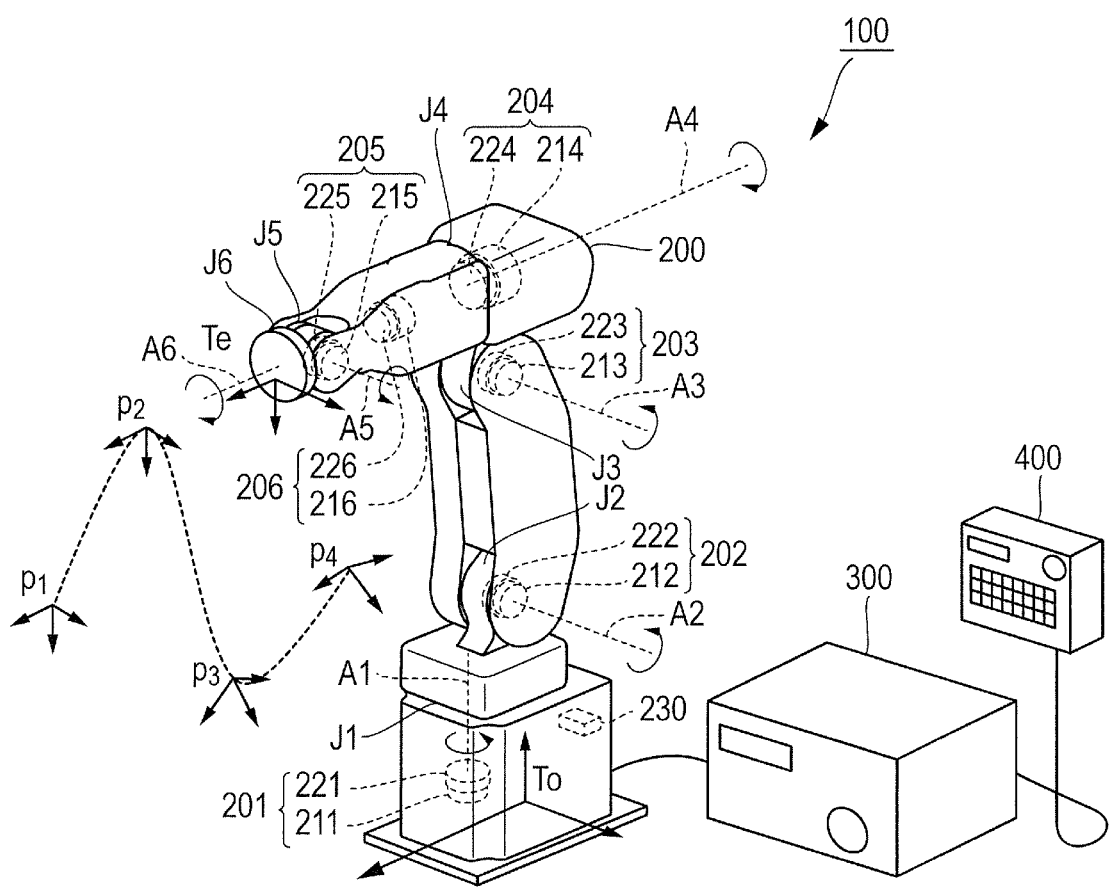
FIG. 1 is an explanatory diagram illustrating a schematic configuration of a robot apparatus according to the present invention.

In the following, a first embodiment of the present invention is described with reference to FIGS. 1 to 9. First, a schematic configuration of a robot apparatus is described. As illustrated in FIG. 1, a robot apparatus 100 includes a robot arm 200 serving as a multi-joint robot, and a robot control apparatus 300 for controlling the robot arm 200. Further, the robot apparatus 100 includes a teaching pendant 400 serving as a teaching apparatus for sending data of multiple teaching points to the robot control apparatus 300. The teaching pendant 400 is operated by human, and is used to specify movement (trajectory) of the robot arm 200 and operation of the robot control apparatus 300.

In this embodiment, the robot arm 200 is a 6-joint robot, for example. The robot arm 200 includes multiple (six) actuators 201 to 206 that rotationally drive joints J1 to J6 about joint axes A1 to A6 thereof, respectively. The robot arm 200 can direct its hand (tip of the robot arm) in an arbitrary three-directional posture at an arbitrary three-dimensional position within a movable range. In general, the position and the posture of the robot arm 200 can be expressed in a coordinate system. To in FIG. 1 represents a coordinate system fixed to a pedestal of the robot arm 200, and Te represents a coordinate system fixed to the hand of the robot arm 200.

In this embodiment, the actuators 201 to 206 include electric motors 211 to 216 and speed reducers 221 to 226 connected to the electric motors 211 to 216, respectively. The speed reducers 221 to 226 are connected to frames to be driven by the joints J1 to J6, respectively, via a belt, a bearing, etc. (not shown). In this specification, those speed reducers 221 to 226, the belt, the bearing, and the like are defined as a "transmitting component" that transmits a drive force of a drive source (that is, the electric motors 211 to 216). Note that, the configuration of each of the actuators 201 to 206 is not limited thereto, and each of the actuators 201 to 206 may be formed of, for example, an artificial muscle.

In the first embodiment, a case where the respective joints J1 to J6 are rotary joints is described. In this case, the "joint position" means the angle of the joint. Note that, the respective joints may be prismatic joints. In this case, the "joint position" means the position of the prismatic joint. Similarly, the terms "joint speed," "joint acceleration," and "joint jerk" are used as time derivatives thereof.

The robot arm 200 further includes a servo control unit 230 serving as a drive control unit for controlling the drive of the electric motors 211 to 216 of the respective actuators 201 to 206. The servo control unit 230 outputs, based on the input instruction values, current instructions to the respective electric motors 211 to 216 so that the positions of the respective joints J1 to J6 follow the instruction values, to thereby control the operations of the electric motors 211 to 216. Note that, in this embodiment, the servo control unit 230 is described as being configured of a single control unit, but servo control units corresponding to the respective electric motors 211 to 216 may be provided.

The robot control apparatus 300 receives, from the teaching pendant 400, input instructions of multiple teaching points (teaching point range) (in other words, specification of the trajectory). In order to cause each of the joints J1 to J6 of the robot arm 200 to sequentially follow the multiple teaching points for a movement, the robot control apparatus 300 generates, based on the teaching points, positional instructions to be output to the servo control unit 230 at given time intervals, and outputs the positional instructions at the given time intervals.

The teaching point is a vector (teaching point vector) containing the teaching positions of the respective joints (six joints) J1 to J6 as vector components. Further, the positional instruction finally obtained in the robot control apparatus 300 is a vector containing the goal positions of the respective joints (six joints) J1 to J6 as vector components. In this embodiment, the teaching point and the positional instruction are different in number of points, but are in the same dimension (unit).

In other words, the robot control apparatus 300 is configured to calculate a CP trajectory based on the input teaching points to generate a number of positional instructions in accordance with the trajectory, and output those positional instruction to the servo control unit 230 at given time intervals.

At this time, as is described in detail later, the robot control apparatus 300 performs optimization processing of adjusting the transit speed of the robot arm 200 on the trajectory determined based on the given teaching point range, within ranges of constraint conditions of speed, acceleration, torque, and the like of the respective joints J1 to J6 of the robot arm 200.

FIG. 1 schematically illustrates four teaching points $p_1$, $p_2$, $p_3$, and $p_4$. The robot arm 200 moves along the trajectory determined based on the teaching points.

Figure 2:
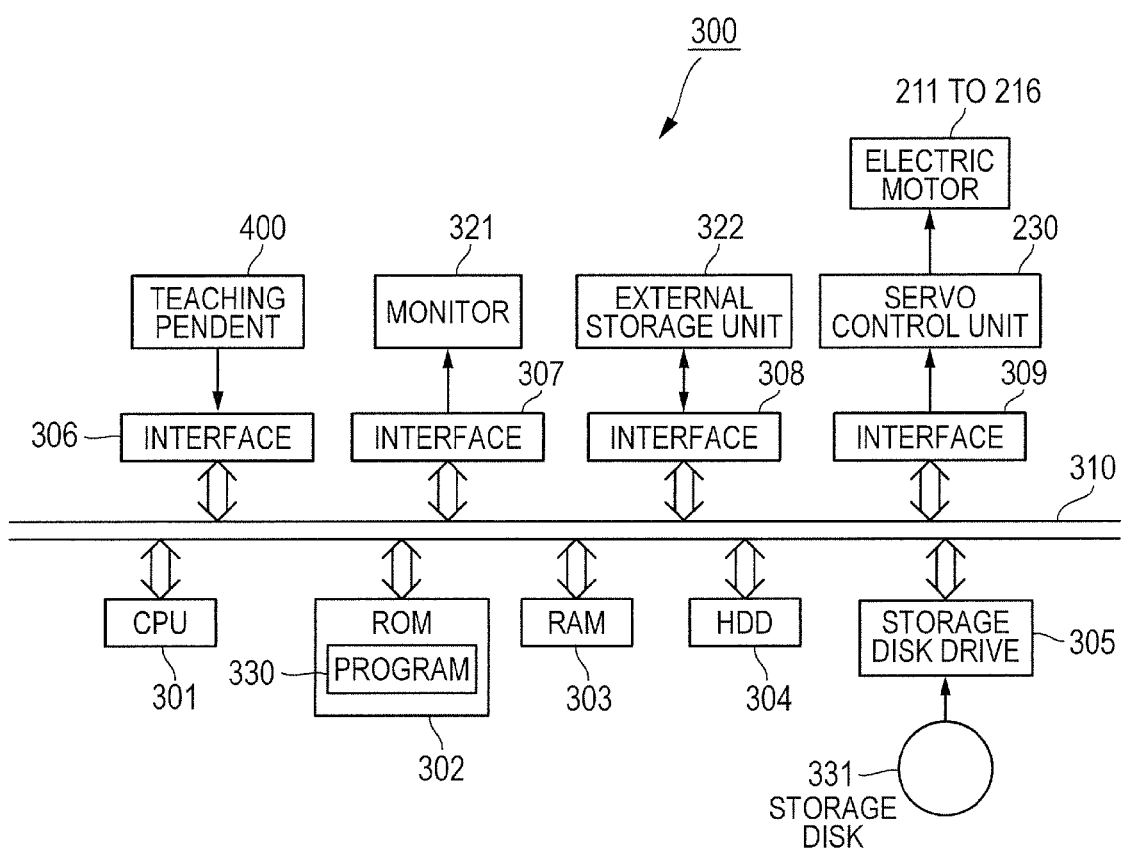
FIG. 2 is a block diagram illustrating a configuration of a robot control apparatus.

FIG. 2 is a block diagram illustrating the configuration of the robot control apparatus 300. The robot control apparatus 300 is a computer including a CPU 301 serving as a calculating unit, a ROM 302, a RAM 303, a hard disk drive (HDD) 304, and a storage disk drive 305 serving as a storage unit, and various interfaces 306 to 309.

The CPU 301 is connected to the ROM 302, the RAM 303, the HDD 304, the storage disk drive 305, and the various interfaces 306 to 309 via a bus 310. The ROM 302 has a program 330 stored thereon, for operating the CPU 301. The program 330 is a program for causing respective units (see FIG. 3) of the CPU 301 to be described in detail later to execute various calculating processing. The RAM 303 is a storage unit for temporarily storing calculating processing results of the CPU 301. The HDD 304 is a storage unit for storing the calculating processing results and various data, and further storing the constraint conditions as a pre-calculated map.

The teaching pendant 400 is connected to the interface 306, and the CPU 301 receives the input of data of teaching points from the teaching pendant 400 via the interface 306 and the bus 310.

The servo control unit 230 of the robot arm 200 is connected to the interface 309, and the CPU 301 outputs the data of the positional instructions at given time intervals to the servo control unit 230 via the bus 310 and the interface 309.

The interface 307 is connected to a monitor 321, and the monitor 321 displays various images. The interface 308 can be connected to an external storage unit 322 such as a rewritable non-volatile memory, external HDD, and the like. The storage disk drive 305 can read out various data, program, and the like stored in a storage disk (storage medium) 331. The storage medium having a program stored thereon according to the present invention is not limited to only the storage disk 331, and also includes a non-volatile memory and an external HDD, such as the external storage unit 322.

Figure 3:
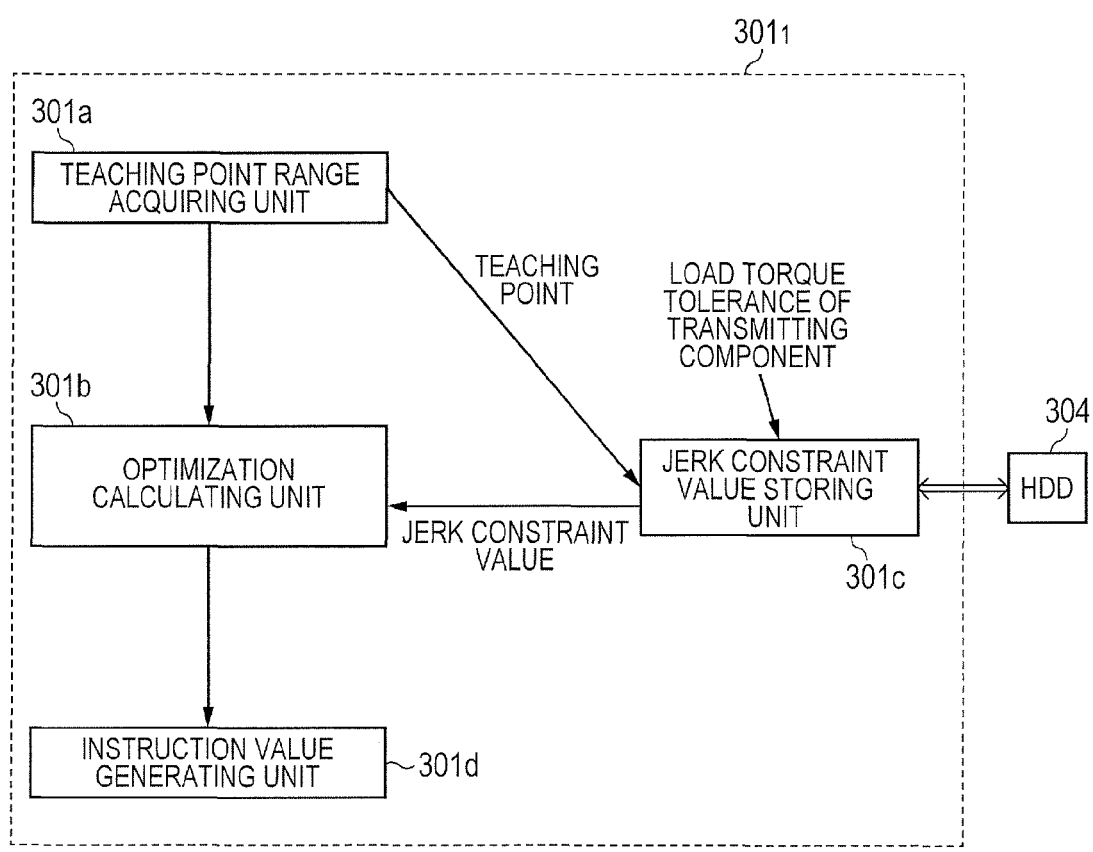
FIG. 3 is a block diagram illustrating a configuration of a control unit according to a first embodiment of the present invention.

Next, respective functions of a CPU (calculating unit) $301_1$ of the first embodiment are described with reference to FIG. 3. In the first embodiment, the program 330 causes the CPU $301_1$ to function as a teaching point range acquiring unit 301a, an optimization calculating unit 301b, a jerk constraint value storing unit 301c, and an instruction value generating unit 301d.

The teaching point range acquiring unit 301a acquires information on teaching point range which is range of points including teaching points instructed from the teaching pendant 400 and teaching points, which is generated through complement among the instructed teaching points. The information on the teaching point range can also be said as an aggregate of teaching points set for the respective six joints, in other words, data of the trajectory of the robot arm 200.

The jerk constraint value storing unit 301c reads out, based on the teaching points acquired by the teaching point range acquiring unit 301a, a jerk constraint value from the constraint conditions stored in the HDD 304. The constraint conditions including the jerk constraint value stored in the HDD 304 are calculated in advance and stored as a map.

When the constraint conditions are calculated in advance, the movable range of the robot arm 200 is divided into multiple spaces, and the jerk constraint value of each joint is calculated so that the load torque to be applied to the above-mentioned transmitting component (speed reducer, belt, bearing, etc.) falls within an allowable range in each space. An example of a case where the movable range of the robot arm 200 is divided into four spaces is described.

Figure 4:
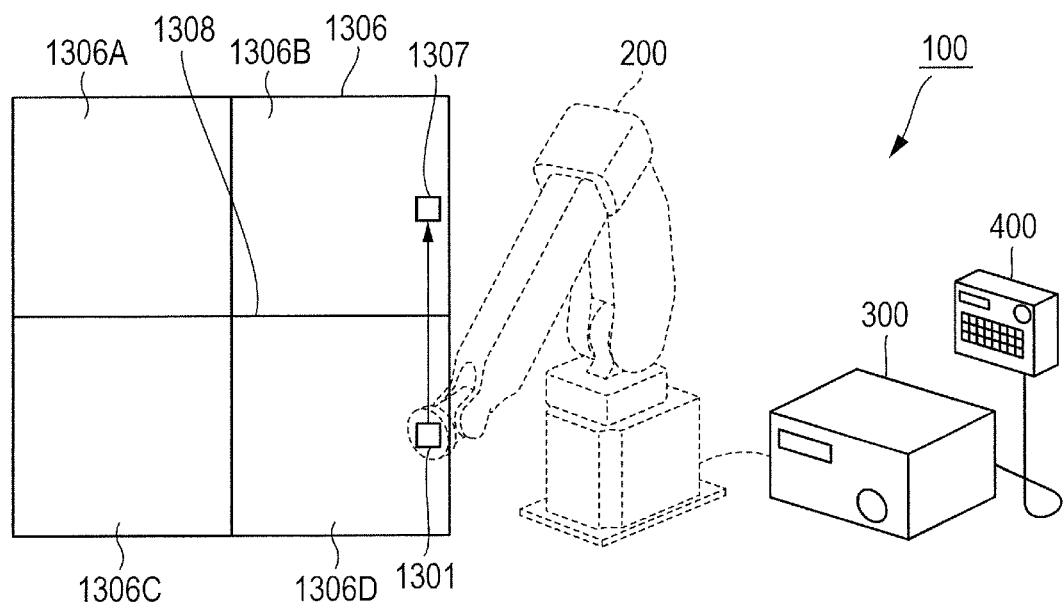
FIG. 4 illustrates a relationship between a movable range of a robot arm and divided spaces.

As illustrated in FIG. 4, the movable range of the robot arm 200 is divided into four spaces 1306A, 1306B, 1306C, and 1306D. The jerk constraint value is calculated for each of the four spaces 1306A, 1306B, 1306C, and 1306D so that the load torque to be generated on the transmitting component, including the moment of inertia based on the posture of the robot arm 200, falls within an allowable range.

The moment of inertia generated on the robot arm 200 is small when the robot arm 200 moves in a bent state, and is large when the robot arm 200 moves in an extended state, for example. Therefore, the moment of inertia is calculated in detail based on the posture of the robot arm 200.

Further, whether or not the load torque to be generated on the transmitting component falls within the allowable range can be calculated based on the rigidity, the brittleness, the elasticity, etc. of each part of the transmitting component, but when the value of durability with respect to the load torque as a product (for example, a catalog value) is known, this value may be used.

After the jerk constraint values as constraint conditions for the four spaces 1306A, 1306B, 1306C, and 1306D are calculated in advance as described above, those constraint conditions (jerk constraint values) are stored in the HDD 304 (constraint condition storing step). With this, in the HDD 304, the jerk constraint values adopted when the joints J1 to J6 transit through the respective spaces are set in advance. For example, when a hand 1301 of the robot arm 200 moves to a teaching point 1307, the robot arm 200 moves from the space 1306D to the space 1306B, and hence the jerk constraint values for the respective joints J1 to J6 are switched at a boundary 1308. Note that, in this embodiment, the case where the movable range is divided into four spaces is described, but as a matter of course, as the number of divided spaces increases, further satisfactory constraint conditions can be set.

As described above, the jerk constraint value storing unit 301c acquires, based on the teaching point range, the jerk constraint values adopted when the joints J1 to J6 transit through the respective spaces. Then, the optimization calculating unit 301b starts calculation of an optimum instruction value of the robot arm 200 based on the teaching point range and the jerk constraint values. When the optimization calculating unit 301b calculates the optimum instruction value, an optimization problem is solved with the acquired jerk constraint values as inequality constraints, and thus the trajectory is calculated. Note that, "solving the optimization problem" means to determine an optimum convergence value pursued to satisfy the durability and the takt time as described in detail later.

Figure 5:
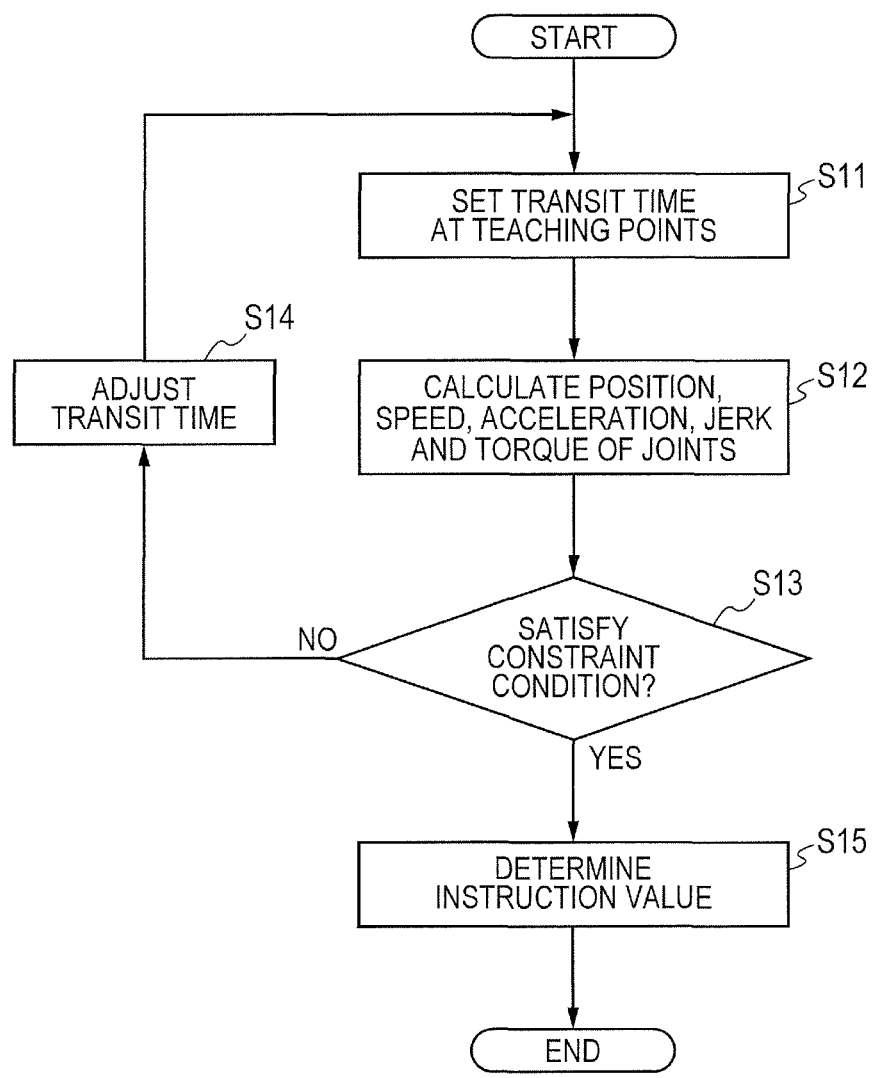
FIG. 5 is a flow chart illustrating instruction value calculating processing performed by an optimization calculating unit.

Specifically, as illustrated in FIG. 5, the optimization calculating unit 301b first sets a transit time t at each teaching point of the teaching point range (S11). Subsequently, with respect to the set transit time, a position (angle) θ, speed v, acceleration α, jerk Δα, and torque T of the joint for each point are calculated (S12). Note that, the values of the position (angle) θ, the speed v, the acceleration α, and the jerk Δα of the joint for each point may all be expressed by a vector in which the values for all the joints are vertically arranged. Further, the torque T of the joint can be calculated by substituting the position θ, the speed v, and the acceleration α of the joint into an equation of motion of the robot arm 200.

Subsequently, it is determined whether or not the jerk Δα satisfies the constraint condition, that is, whether or not the absolute value of the jerk Δα is smaller than the absolute value of the jerk constraint value acquired by the jerk constraint value storing unit 301c (inequality constraint) (S13). When the constraint condition is not satisfied (No in S13), the transit time t of the teaching point is adjusted (S14), and the calculation is repeated until the constraint condition is satisfied (that is, the optimization problem is solved). With this, the constraint condition is eventually satisfied (Yes in S13), and thus the instruction value for each of the joints (electric motors 211 to 216) to accomplish the shortest time period for the movement of the robot arm 200 can be obtained (determined) (S15).

Then, the determined instruction value is sent to the instruction value generating unit 301d illustrated in FIG. 4, and the instruction value generating unit 301d that has received the instruction value generates an instruction value to be sent to the servo control unit 230 (see FIG. 2) (instruction value generating step). The instruction value is instructed against each of the joints (electric motors 211 to 216), to thereby control the robot arm 200 to follow the trajectory instructed by the teaching pendant 400.

Figure 8A:
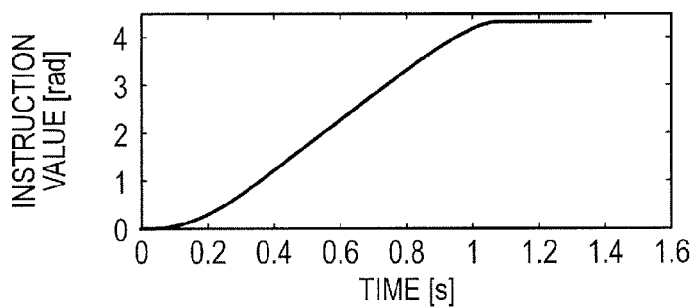
FIG. 8A is a graph showing the instruction value when the robot is controlled by a robot control apparatus according to the present invention with a constant jerk constraint value to perform a movement.
Figure 8B:
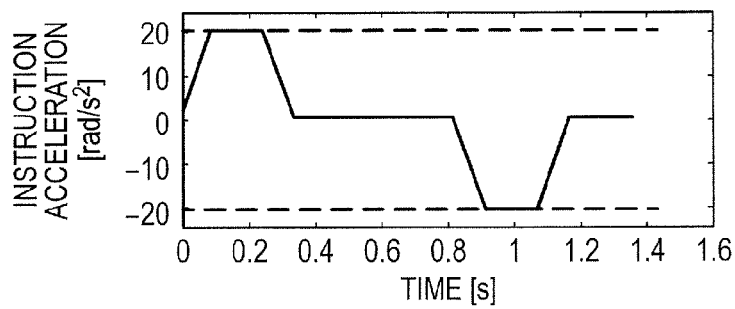
FIG. 8B is a graph showing the instruction acceleration when the robot is controlled by the robot control apparatus according to the present invention with the constant jerk constraint value to perform a movement.
Figure 8C:
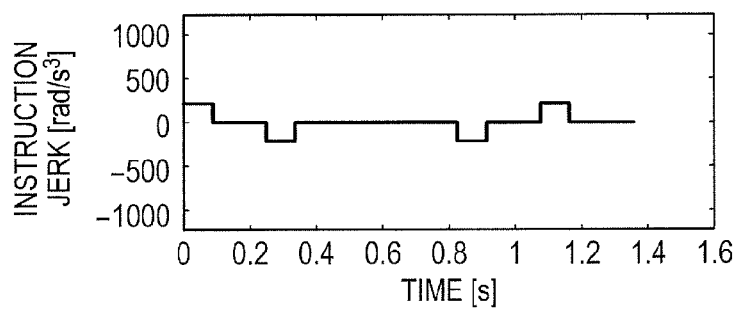
FIG. 8C is a graph showing the instruction jerk when the robot is controlled by the robot control apparatus according to the present invention with the constant jerk constraint value to perform a movement.
Figure 8D:
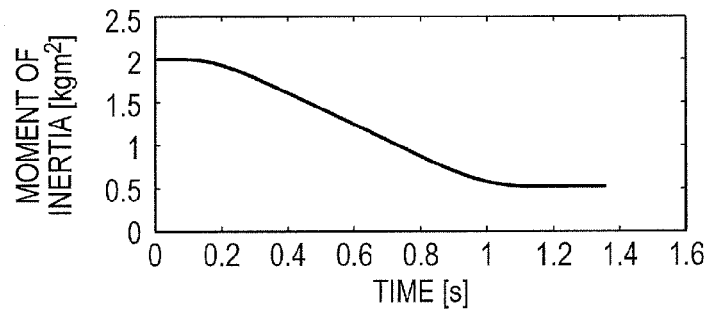
FIG. 8D is a graph showing the moment of inertia when the robot is controlled by the robot control apparatus according to the present invention with the constant jerk constraint value to perform a movement.
Figure 9:
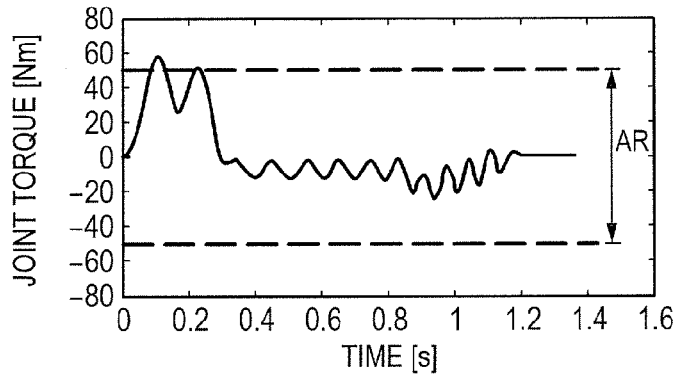
FIG. 9 is a graph showing the joint torque when the robot is controlled by the robot control apparatus with the constant jerk constraint value to perform a movement.

The effects to be obtained when the robot arm 200 is controlled with the optimized instruction value as described above are verified with reference to FIGS. 6A to 9. The case illustrated in FIGS. 8A to 9 is an example of experimental values in a case where the instruction value is calculated with a fixed jerk constraint value in the entire region, and one joint of the robot arm 200 is driven so as to follow a given trajectory. The instruction value (value of the joint angle) at this time changes as shown in FIG. 8A. Further, at this time, the acceleration α changes as shown in FIG. 8B, the jerk changes as shown in FIG. 8C, and the moment of inertia is generated on the joint as shown in FIG. 8D. In this case, as understood from FIG. 9, the torque generated on the joint when the joint is accelerated exceeds an allowable range AR, whereas the torque generated on the joint when the joint is decelerated has too much margin with respect to the allowable range AR.

Figure 6A:
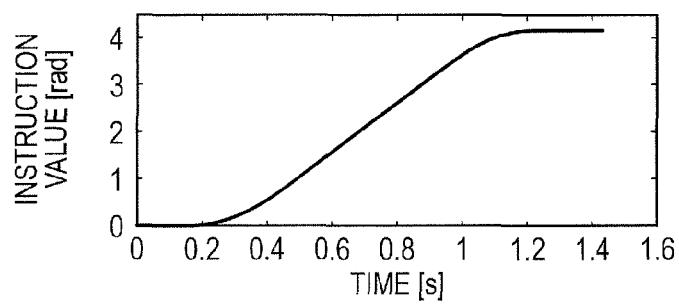
FIG. 6A is a graph showing an instruction value when the robot is controlled by the robot control apparatus according to the present invention to perform a movement.
Figure 6B:
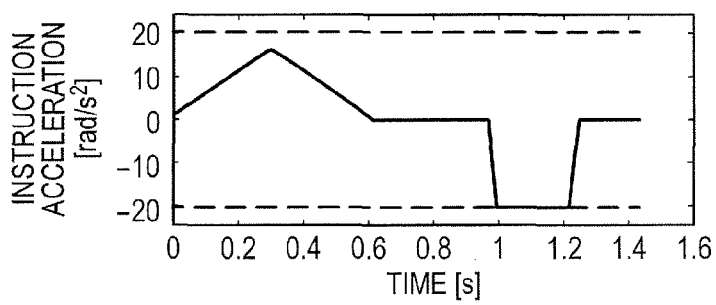
FIG. 6B is a graph showing instruction acceleration when the robot is controlled by the robot control apparatus according to the present invention to perform a movement.
Figure 6C:
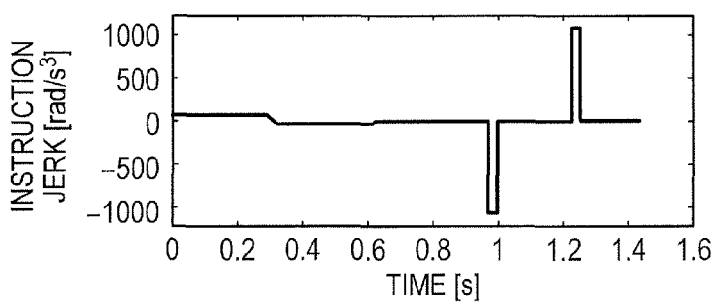
FIG. 6C is a graph showing instruction jerk when the robot is controlled by the robot control apparatus according to the present invention to perform a movement.
Figure 6D:
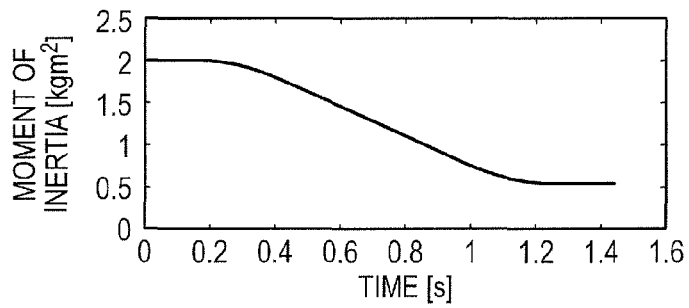
FIG. 6D is a graph showing the moment of inertia when the robot is controlled by the robot control apparatus according to the present invention to perform a movement.
Figure 7:
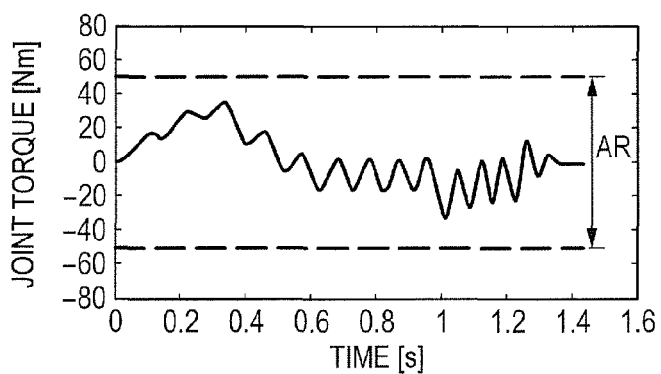
FIG. 7 is a graph showing joint torque when the robot is controlled by the robot control apparatus according to the present invention to perform a movement.

FIGS. 6A to 7 show experimental values in a case where the instruction value set by the robot control apparatus 300 according to this embodiment is used to similarly drive one joint of the robot arm 200 so as to follow a given trajectory. The instruction value (value of the joint angle) at this time changes as shown in FIG. 6A. Further, at this time, the acceleration α changes as shown in FIG. 6B, the jerk changes as shown in FIG. 6C, and the moment of inertia is generated on the joint as shown in FIG. 6D.

That is, as understood from FIG. 6C, in this embodiment, the jerk value is small when the joint is accelerated, and is large when the joint is decelerated. This is because the constraint conditions stored in advance in the HDD 304 are set so that the jerk constraint value is small when the moment of inertia is large and the jerk constraint value is large when the moment of inertia is small. With this, even when the robot arm 200 is controlled to follow the same trajectory as in the case shown in FIGS. 8A to 9, as understood from FIG. 7, the torque generated on the joint falls within the allowable range AR (present within the allowable range). In particular, when the joint is accelerated, the instruction jerk is reduced to suppress the load torque to be generated on the joint, and when the joint is decelerated, the instruction jerk is increased within the allowable range AR, so that the deceleration time period can be reduced.

As described above, in the robot control apparatus 300, the HDD 304 serving as the storage unit stores the constraint conditions determined so that the load torque to be applied to the transmitting component falls within the allowable range AR. Then, the CPU 301 serving as the calculating unit generates, based on the trajectory of the robot arm 200, the instruction value from the stored constraint conditions. With this, in the robot apparatus 100 controlled with the instruction value, the load torque to be applied to the transmitting component is prevented from exceeding the allowable range AR during movement. Further, it is unnecessary to perform processing of protecting the robot arm 200 during the movement, so that the takt time may be prevented from being significantly affected. Since the load torque to be applied to the transmitting component is prevented from exceeding the allowable range AR during movement, the durability of the robot arm 200 may be improved. Furthermore, the robot arm 200 is controlled to be driven with the optimized instruction value in a state in which the load torque to be applied to the transmitting component falls within the allowable range AR, and hence the shortest takt time can be accomplished without impairing the durability.

Second Embodiment

Subsequently, a second embodiment of the present invention, which is obtained by partially changing the above-mentioned first embodiment, is described with reference to FIGS. 10 to 13. Note that, in the description of the second embodiment, parts similar to those of the first embodiment are denoted by the same reference symbols, and description thereof is omitted.

The second embodiment differs from the first embodiment in that the robot control apparatus 300 according to the second embodiment is configured to simulate, based on the calculation of the load torque using a dynamics model, whether or not the instruction value calculated in the optimization calculating unit 301b satisfies the constraint conditions. As a result of the simulation using the dynamics model by a dynamics simulator (movement simulator), in a case where the constraint conditions are not satisfied when the robot arm 200 is driven with the instruction value, the constraint conditions (jerk constraint value) are updated.

Figure 10:
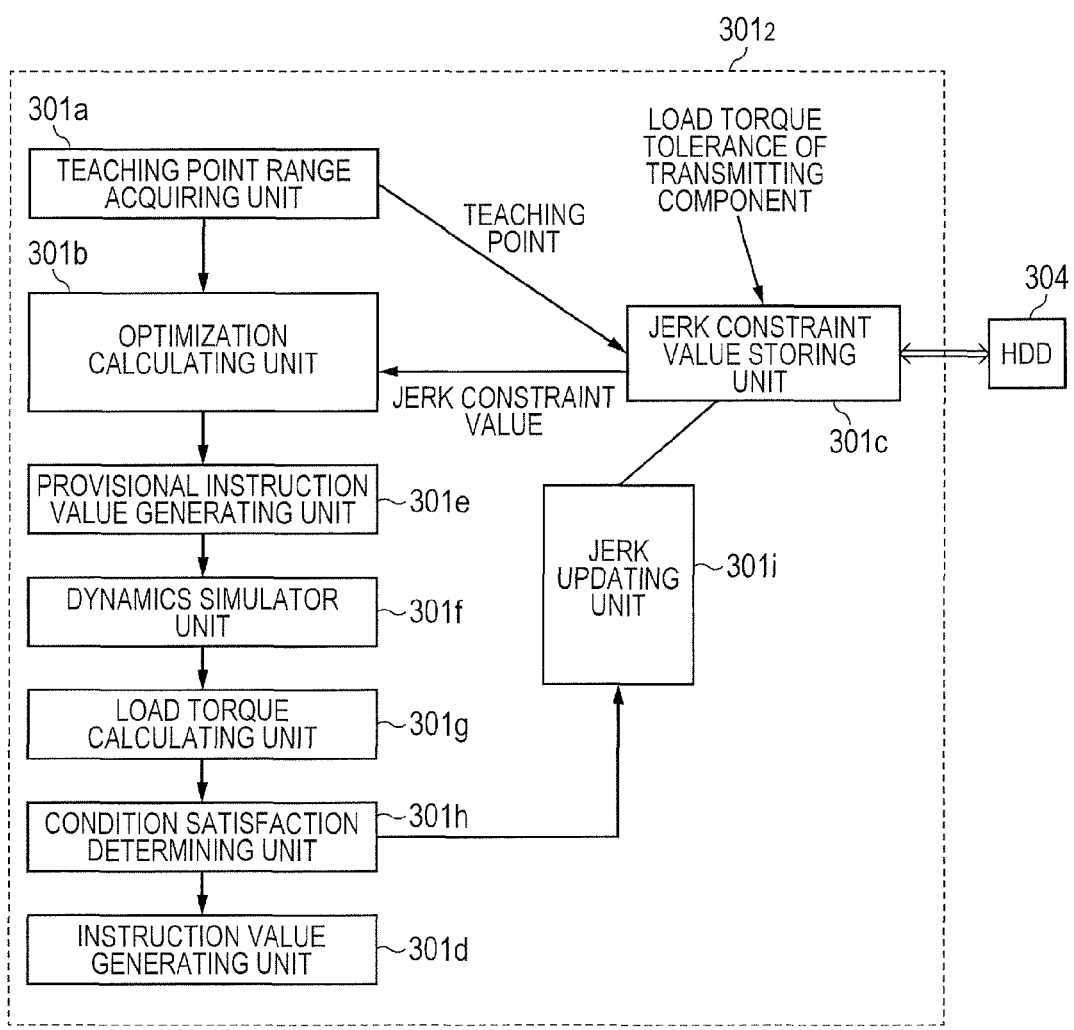
FIG. 10 is a block diagram illustrating a configuration of a control unit according to a second embodiment of the present invention.

Specifically, as illustrated in FIG. 10, a CPU $301_2$ serving as the calculating unit in the second embodiment functions as the following units in addition to the teaching point range acquiring unit 301a, the optimization calculating unit 301b, the jerk constraint value storing unit 301c, and the instruction value generating unit 301d. That is, the CPU $301_2$ functions, between the optimization calculating unit 301b and the instruction value generating unit 301d, as a provisional instruction value generating unit 301e, a dynamics simulator unit 301f, a load torque calculating unit 301g, a condition satisfaction determining unit 301h, and a jerk updating unit 301i.

Figure 13:
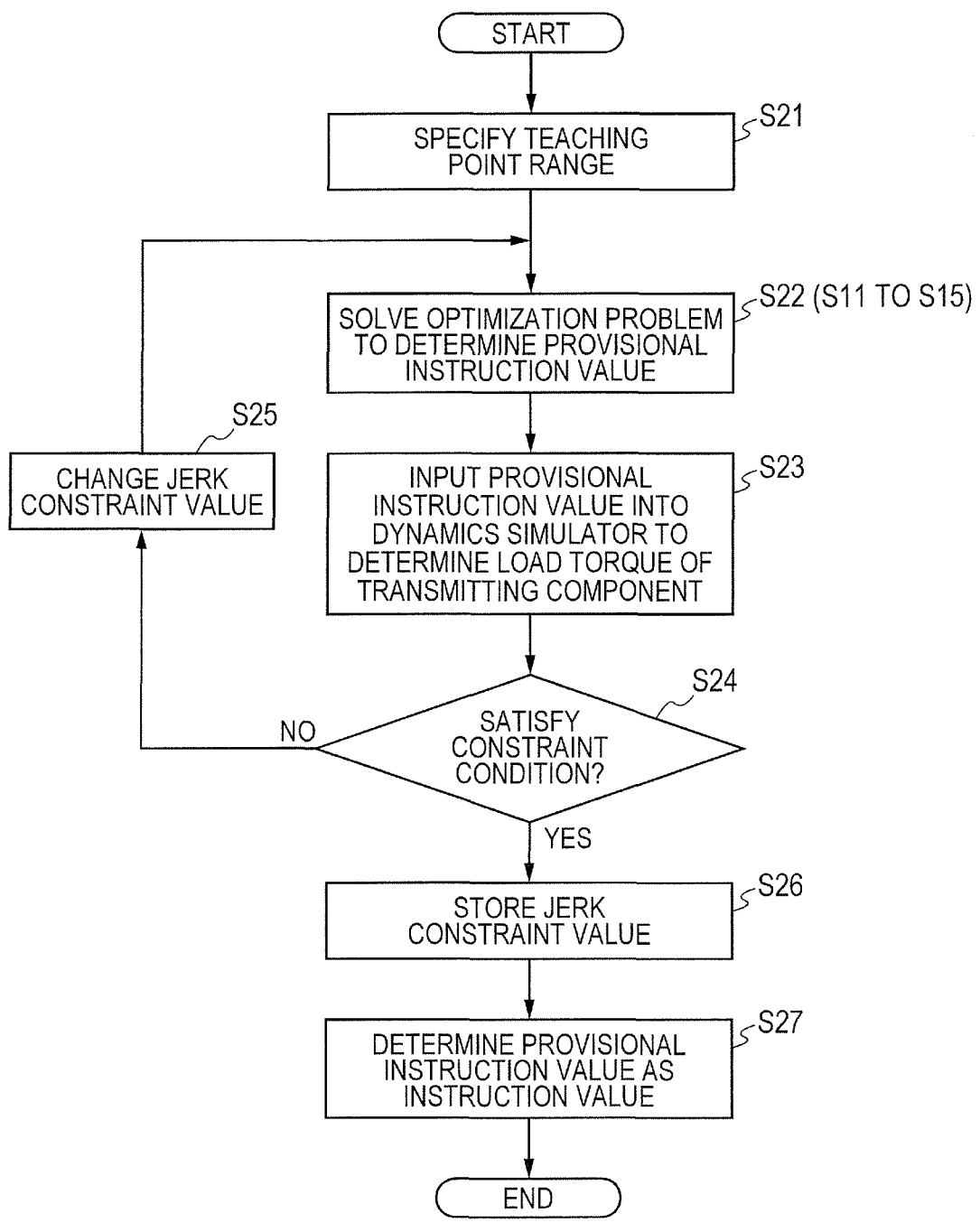
FIG. 13 is a flow chart illustrating instruction value calculating processing according to the second embodiment.

As illustrated in FIG. 13, when the calculation control of the robot control apparatus 300 is started, first, the teaching point range is specified by the teaching pendant 400 (S21). Then, the optimization calculating unit 301b solves the optimization problem similarly to the case of the first embodiment (S11 to S15 of FIG. 5) to determine the instruction value. Then, the provisional instruction value generating unit 301e generates the instruction value calculated by the optimization calculating unit 301b as a provisional instruction value (S22).

Subsequently, the dynamics simulator unit 301f inputs the provisional instruction value into a dynamics simulator including a robot arm model, and the load torque calculating unit 301g calculates and determines the load torque of the transmitting component based on the calculation results of the dynamics simulator (S23).

Figures 11, 12:
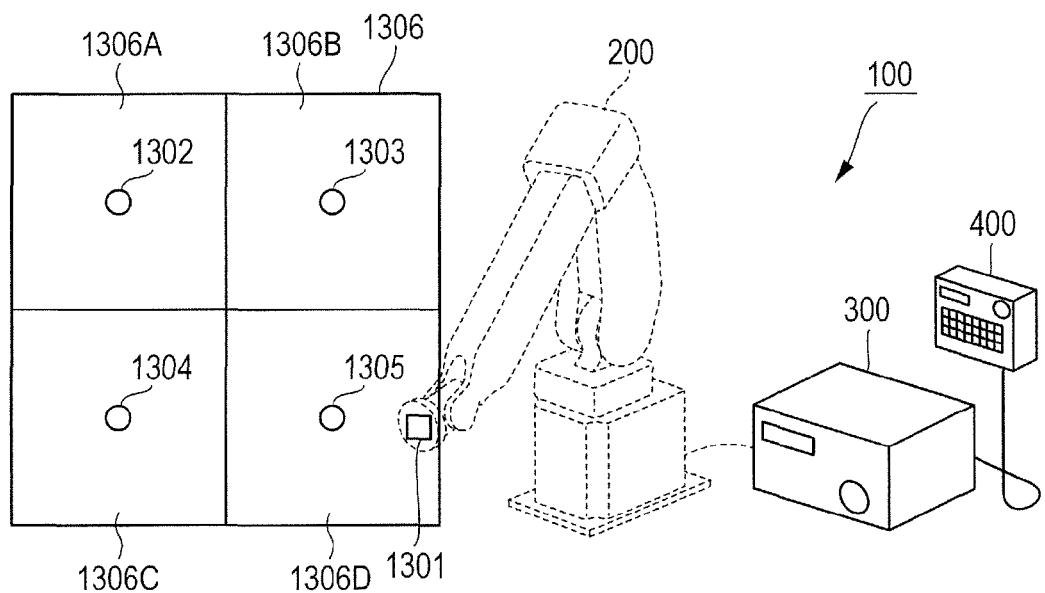
FIG. 11 illustrates a case where teaching points are set to respective divided spaces.
FIG. 12 is a table showing the movement pattern when the respective teaching points of FIG. 11 are set to a starting point and an end point.

The calculation of the dynamics simulator (simulation) is now described with reference to FIGS. 11 and 12. As illustrated in FIG. 11, the movable range of the robot arm 200 is divided into multiple spaces (for example, four spaces), and points 1302, 1303, 1304, and 1305 as center points of the respective spaces 1306A, 1306B, 1306C, 1306D are set as the teaching points.

It is impossible to move through all of the spaces in one movement, and hence in order to set optimum jerk constraint values for all of the spaces, multiple movements are required to be simulated. FIG. 12 shows a table in which a starting point and an end point are set so that all of the movements among those center points can be realized.

For example, the movement between the teaching point 1302 and the teaching point 1303 has different loads of the transmitting component on the way to and from the point. Therefore, for example, when the movable range is divided into four spaces, teaching point ranges (trajectories) for 12 different movements are created, and dynamics simulation calculation for each teaching point range is performed based on a provisional instruction value, whereby the load torque in each of movements 1 to 12 is calculated.

After the dynamics simulator unit 301*f* performs the dynamics simulation calculation as described above to determine the simulated load torque, the condition satisfaction determining unit 301*h* determines whether or not the constraint conditions are satisfied (S24). The case where the simulated load torque of the transmitting component is out of the tolerance (No in S24) means any one of the case where the load torque of the transmitting component is so large that the durability may be affected, and the case where the load torque of the transmitting component is too small and the movement time period is long.

In this case, the jerk updating unit 301*i* instructs the jerk constraint value storing unit 301*c* to change (update) the jerk constraint value, to thereby revise the jerk constraint value corresponding to the teaching points range stored in the HDD 304 (S25). Then, the calculation processing of Steps S22 to S24 is performed again, and the calculation is repeated until the jerk constraint value is not revised. The revising amount of the jerk constraint value can be determined with use of the calculation results of the dynamics simulation. With this repeated calculation, the optimum jerk constraint value in a space through which the robot arm 200 transits during a certain movement is determined.

Then, when the simulated load torque of the transmitting component falls within the tolerance (Yes in S24), the jerk constraint value at this time is stored in the HDD 304 (S26). Further, the instruction value generating unit 301*d* determines the provisional instruction value at this time as the instruction value (that is, generates the instruction value) (S27), and thus the instruction value calculation control is ended.

With this, the robot arm 200 is actually moved with the instruction value determined based on the calculation by the dynamics simulator, and hence the load torque to be applied to the transmitting component is more reliably prevented from exceeding the allowable range AR during the movement. Further, the robot arm 200 is controlled to be driven with the instruction value optimized by the dynamics simulator in a state in which the load torque to be applied to the transmitting component falls within the allowable range AR, and hence the takt time can be set further shorter without impairing the durability.

Note that, the configurations, actions, and effects other than the above are similar to those in the first embodiment, and hence description thereof is omitted.

Third Embodiment

Subsequently, a third embodiment of the present invention, which is obtained by partially changing the above-mentioned first embodiment, is described with reference to FIGS. 14 and 15. Note that, in the description of the third embodiment, parts similar to those of the first embodiment are denoted by the same reference symbols, and description thereof is omitted.

The third embodiment differs from the first embodiment in that the robot control apparatus 300 according to the third embodiment is configured to calculate the torque generated when the robot arm 200 is actually driven, and learn the constraint conditions when the constraint conditions are not achieved.

Figure 14:
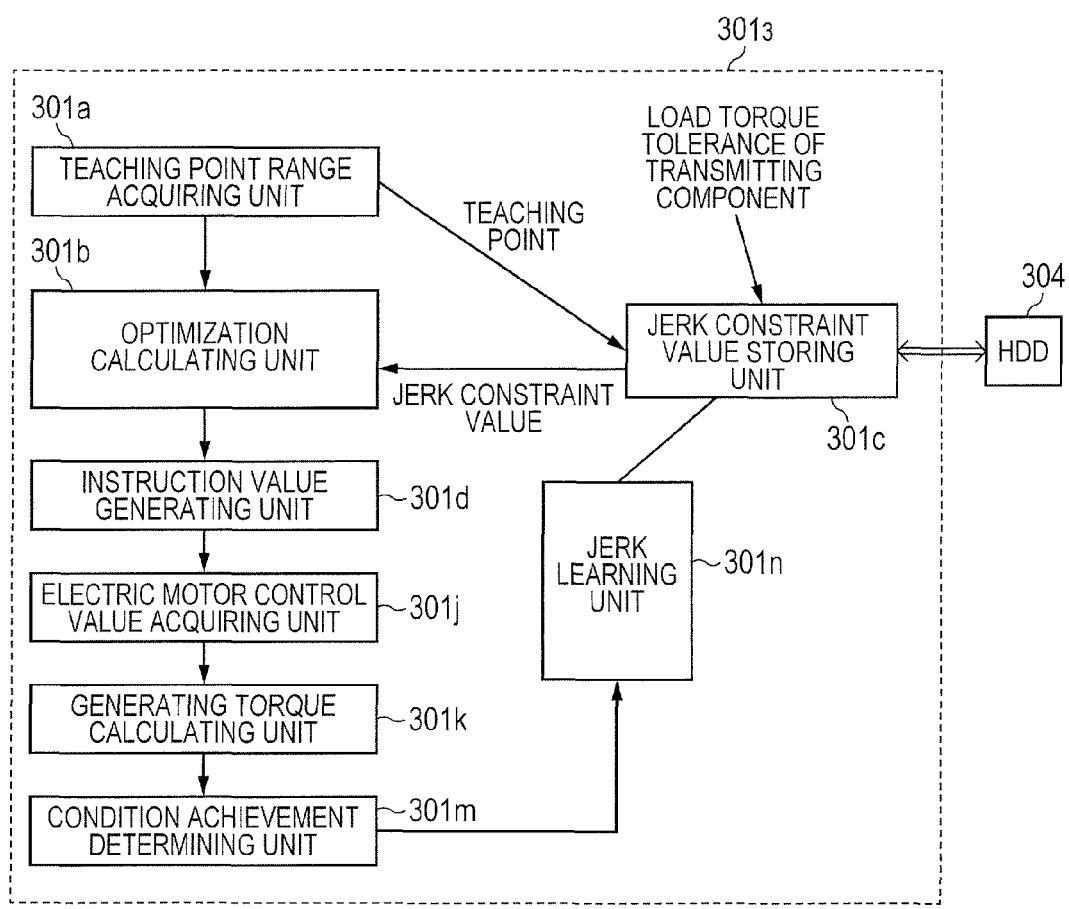
FIG. 14 is a block diagram illustrating a configuration of a control unit according to a third embodiment of the present invention.

Specifically, as illustrated in FIG. 14, a CPU $301_3$ serving as the calculating unit in the third embodiment functions as the following units in addition to the teaching point range acquiring unit 301*a*, the optimization calculating unit 301*b*, the jerk constraint value storing unit 301*c*, and the instruction value generating unit 301*d*. That is, the CPU $301_3$ functions, after the instruction value generating unit 301*d*, as an electric motor control value acquiring unit 301*j*, a generating torque calculating unit 301*k*, a condition achievement determining unit 301*m*, and a jerk learning unit 301*n*.

Figure 15:
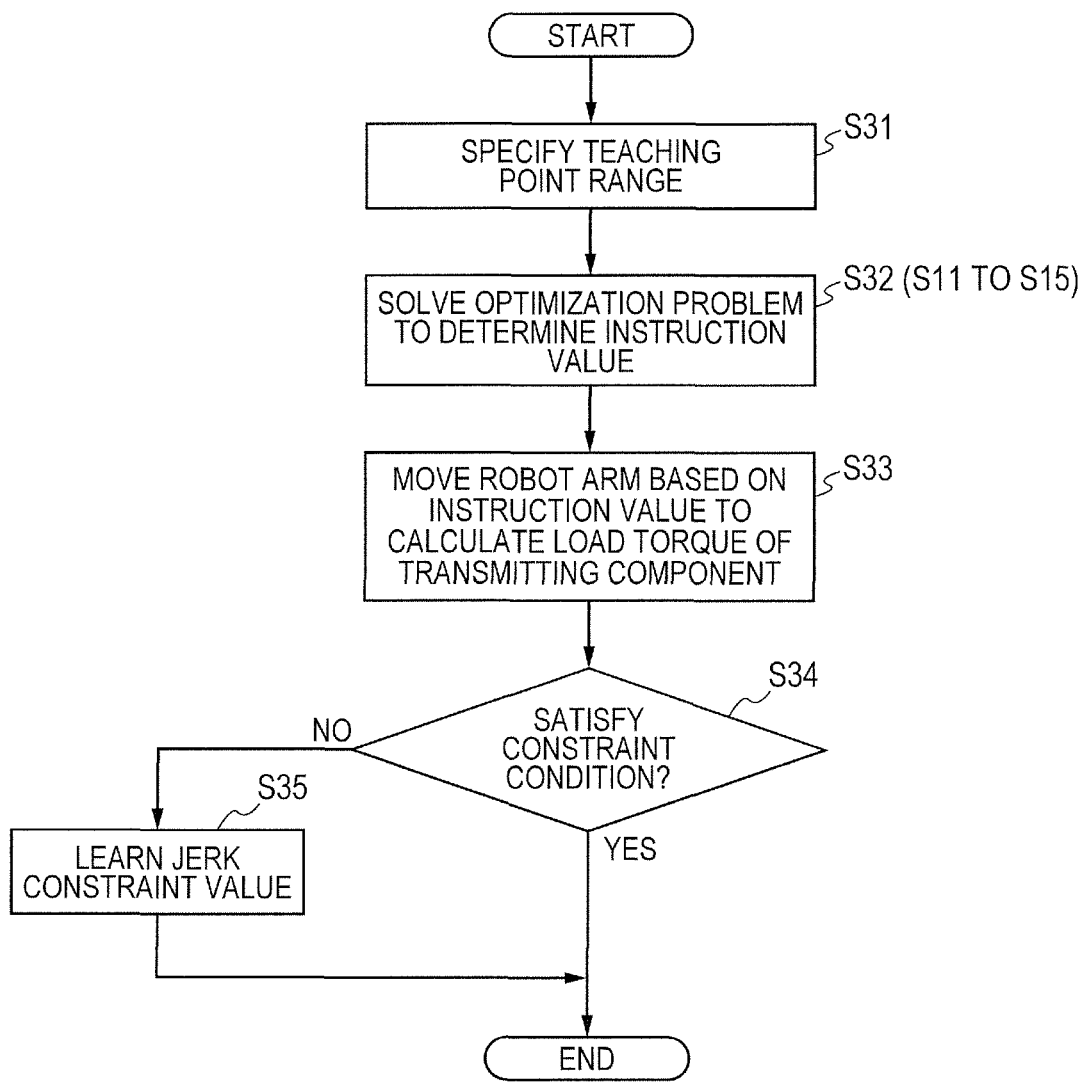
FIG. 15 is a flow chart illustrating jerk constraint value learning control according to the third embodiment.

As illustrated in FIG. 15, when the learning control of the robot control apparatus 300 is started, first, the teaching point range is specified by the teaching pendant 400 (S31). Then, the optimization calculating unit 301*b* solves the optimization problem similarly to the case of the first embodiment (S11 to S15 of FIG. 5) to determine the instruction value (S32).

Subsequently, the robot control apparatus 300 sends the instruction value to the servo control unit 230 so as to control the drive of the electric motors 211 to 216, and causes the robot arm 200 to move so that the robot arm 200 follows the teaching point range (trajectory) specified by the teaching pendant 400. Then, the load torque of each transmitting component (speed reducer, belt, bearing, etc.) during the movement is calculated (S33).

Specifically, when the load torque of the transmitting component is calculated, the electric motor control value acquiring unit 301*j* acquires control values (motor output and motor angle) for the electric motors 211 to 216 based on the instruction value sent to the servo control unit 230. Then, the generating torque calculating unit 301*k* calculates the torque to be generated on each transmitting component based on the control values for the electric motors 211 to 216, and sets the calculated torque as the load torque.

After the generating torque calculating unit 301*k* determines the load torque actually generated on the robot arm 200 as described above, the condition achievement determining unit 301*m* determines whether or not the constraint conditions are satisfied (achieved) (S34). The case where the load torque actually generated on the transmitting component is out of the tolerance (No in S34) means any one of the case where the load torque of the transmitting component is so large that the durability may be affected through repetitive execution of the movement, and the case where the load torque of the transmitting component is too small and the movement time period is long.

In this case, the jerk learning unit 301*n* instructs the jerk constraint value storing unit 301*c* to learn (update) the jerk constraint value, to thereby revise the jerk constraint value corresponding to the teaching point range stored in the HDD 304 (S35). The revising amount of the jerk constraint value can be determined with use of the calculation results of the generating torque calculated by the generating torque calculating unit 301*k*. Such a learning control is repeated to the same movement of the robot arm 200, so that the optimum jerk constraint value in a space through which the robot arm 200 transits during this movement is learned.

Further, when the load torque actually generated on the transmitting component falls within the tolerance (Yes in S34), it means that the previous results of the learning control during the movement are satisfactory, and hence the control is directly ended without revising the jerk constraint value.

As described above, the learning control is performed with the load torque generated when the robot arm 200 is actually moved, and hence the load torque to be applied to the transmitting component during the subsequent movements can be prevented from exceeding the allowable range AR. Further, the robot arm 200 is controlled to be driven with the instruction value optimized by the learning control in a state in which the load torque to be applied to the transmitting component falls within the allowable range AR, and hence the takt time can be set further shorter without impairing the durability.

Note that, the configurations, actions, and effects other than the above are similar to those in the first embodiment, and hence description thereof is omitted.

In the first to third embodiments described above, the case where the jerk constraint value for each joint in each space is set as the constraint conditions is described, but the present invention is not limited thereto, and an acceleration constraint value of each joint, a speed constraint value of each joint, and the like may be added to the constraint conditions. With this, a further optimum instruction value can be determined.

Further, as the constraint conditions, the jerk constraint value for each joint with respect to the workpiece weight, the moving distance, and the movement direction for each moving distance may be added. With this setting, a further optimum instruction value may be determined. For example, the workpiece weight may be set as 1 kg, 1.5 kg, and 2 kg, and the movement pattern may be increased up to three times. Through calculation under those settings, the optimum jerk constraint value for each space and weight can be determined.

In the first to third embodiments described above, the case where the teaching point range is represented by the positions of the respective joints is described. However, in a case where the teaching point range is represented by the position and posture in a three-dimensional space, the position and posture may be converted into the positions of the respective joints through inverse-kinematic calculation.

In the first to third embodiments described above, as a method for optimizing the instruction value (constraint condition), a method of adjusting the transit time for each teaching point and repeating the calculation until the constraint conditions are satisfied is described. It is conceivable to use time in the evaluation function for the optimization at this time to determine the trajectory that accomplishes the shortest time period.

In the first to third embodiments described above, the case where the movable range of the robot arm 200 is divided into four spaces is described as an example, but it is needless to say that a further optimum trajectory can be determined as the number of divided spaces is increased. Note that, when the number of divided spaces is increased as described above or the number of the constraint conditions (constraint values) is increased, the calculation time period is increased, but the calculation of the constraint condition itself is performed prior to the robot arm movement, and hence the calculation does not affect the time period for the robot arm movement.

In the first to third embodiments described above, the case where the robot arm 200 is a 6-joint robot including six joints is described, but the number of joints is not limited thereto. Further, the drive direction of the joint is not limited to drive in the rotational direction, and includes drive in a linear motion direction (extending and contracting drive).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the storage unit stores the constraint conditions determined so that the load torque to be applied to the transmitting component falls within the allowable range, and the calculating unit generates, based on the trajectory of the robot arm, the instruction value from the stored constraint conditions. With this, in the robot arm controlled with the generated instruction value, the load torque to be applied to the transmitting component is prevented from exceeding the allowable range during movement, and it is unnecessary to perform processing of protecting the robot arm during the movement. Thus, the takt time may be prevented from being significantly affected. Further, since the load torque to be applied to the transmitting component is prevented from exceeding the allowable range during the movement, the durability of the robot arm may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-151733, filed Jul. 5, 2012, which is hereby incorporated by reference herein in its entirety.

What is claimed is:

1. A robot control method of a robot control apparatus for controlling a robot arm to be driven by transmitting a drive force to each of multiple joints from each of drive sources corresponding thereto via a transmitting component so that the robot arm follows a specified trajectory, the control being carried out based on an instruction value to be instructed to each of the drive sources, the robot control method comprising:

storing, in a storage unit, constraint conditions including a constraint value of a jerk for each of the multiple joints;

calculating, by said robot control apparatus, the constraint conditions differently for each of multiple spaces into which a movable range of the robot arm is divided, so that a load torque to be applied to the transmitting component falls within an allowable range;

generating, by a calculating unit, the instruction value based on the specified trajectory of the robot arm by solving an optimization problem that uses the constraint conditions stored in the storage unit as an inequality constraint;

sending the instruction value to a servo control unit configured to control the drive source in the robot arm; and controlling the robot arm based on the instruction value.

2. A computer readable non-transitory storage medium having a program stored thereon, that when executed, causes a computer to perform a method for controlling a robot arm to be driven by transmitting a drive force to each of multiple joints from each of drive sources corresponding thereto via a transmitting component so that the robot arm follows a specified trajectory, the control being carried out based on an instruction value to be instructed against the each of the drive sources, the method comprising:

storing, in a storage unit, constraint conditions including a constraint value of a jerk for each of the multiple joints;

calculating, by said robot control apparatus, the constraint conditions differently for each of multiple spaces into which a movable range of the robot arm is divided, so that a load torque to be applied to the transmitting component falls within an allowable range;

generating, by a calculating unit, the instruction value based on the specified trajectory of the robot arm by solving an optimization problem that uses the constraint conditions stored in the storage unit as an inequality constraint;

sending the instruction value to a servo control unit configured to control the drive source in the robot arm; and controlling the robot arm based on the instruction value.

3. A robot control apparatus, which is configured to control a robot arm to be driven by transmitting a drive force to each of multiple joints from each of drive sources corresponding thereto via a transmitting component so that the robot arm follows a specified trajectory, the control being carried out based on an instruction value to be instructed to each of the drive sources, the robot control apparatus comprising:

a storage unit configured to store constraint conditions including a constraint value of a jerk for each of the multiple joints;

said robot control apparatus configured to calculate the constraint conditions differently for each of multiple spaces into which a movable range of the robot arm is divided, so that a load torque to be applied to the transmitting component falls within an allowable range;

a calculating unit configured to generate the instruction value based on the specified trajectory of the robot arm by solving an optimization problem that uses the constraint conditions stored in the storage unit as an inequality constraint;

a servo control unit configured to control the drive source in the robot arm; and an interface arranged to connect with the servo control unit, so that the interface is configured to send the instruction value to the servo control unit.

4. A robot control apparatus according to claim 1, wherein the calculating unit is configured to perform a movement simulator that calculates a dynamics model for the each of the multiple spaces to be obtained when the robot arm is controlled based on the instruction value, and to calculate the constraint conditions based on the load torque to be applied to the transmitting component, the load torque being determined based on the dynamics model calculated by the movement simulator, and wherein the storage unit is configured to update the constraint conditions to the constraint conditions calculated by the movement simulator.

5. A robot control apparatus according to claim 1, wherein the calculating unit is configured to determine the load torque to be actually applied to the transmitting component when the robot arm is controlled based on the instruction value, and to calculate the constraint conditions based on the load torque to be actually applied to the transmitting component, and wherein the storage unit is configured to update the constraint conditions to the constraint conditions calculated based on the load torque to be actually applied to the transmitting component.

6. A robot apparatus, comprising:

a robot arm; and a robot control apparatus, which is configured to control the robot arm to be driven by transmitting a drive force to each of multiple joints from each of drive sources corresponding thereto via a transmitting component so that the robot arm follows a specified trajectory, the control being carried out based on an instruction value to be instructed to each of the drive sources, the robot control apparatus comprising:

a storage unit configured to store constraint conditions including a constraint value of a jerk for each of the multiple joints;

said robot control apparatus configured to calculate the constraint conditions differently for each of multiple spaces into which a movable range of the robot arm is divided, so that a load torque to be applied to the transmitting component falls within an allowable range;

a calculating unit configured to generate the instruction value based on the specified trajectory of the robot arm by solving an optimization problem that uses the constraint conditions stored in the storage unit as an inequality constraint;

a servo control unit configured to control the drive source in the robot arm; and an interface arranged to connect with the servo control unit, so that the interface is configured to send the instruction value to the servo control unit.

* * * * *